Dec. 20, 1927. 1,653,038
E. A. DEWALD
DOUBLE PIVOT SUPPORT FOR DUMP BODIES
Filed Dec. 29, 1923
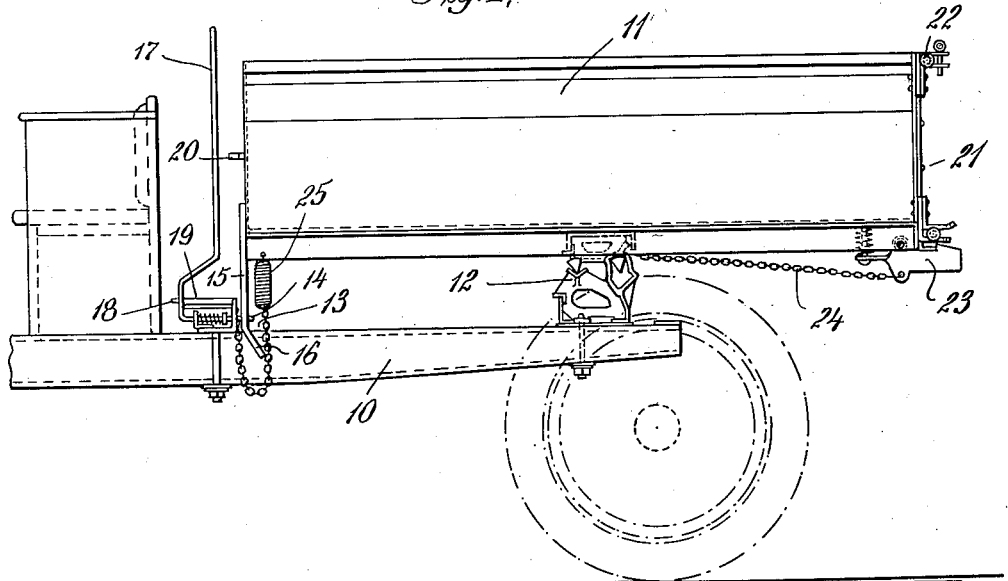
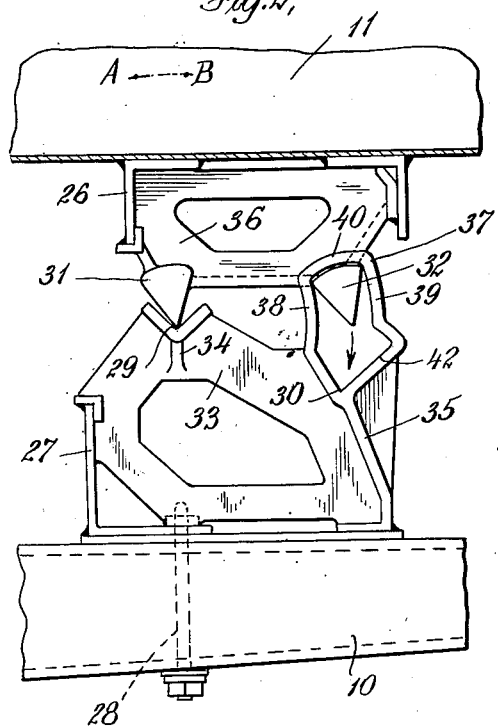 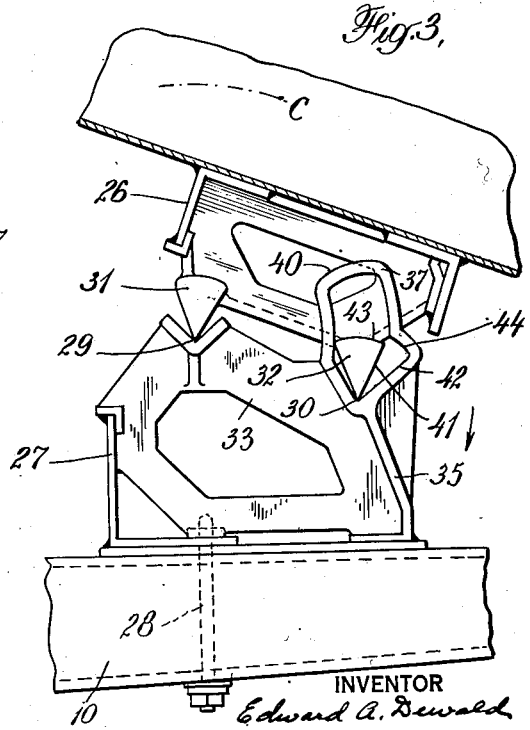
INVENTOR
Edward A. Dewald
BY
Pennie, Davis, Marvin and Edmonds
his ATTORNEYS Patented Dec. 20, 1927.

1,653,038

UNITED STATES PATENT OFFICE.

EDWARD A. DEWALD, OF MASSILLON, OHIO, ASSIGNOR TO THE GRISCOM RUSSELL COMPANY, OF NEW YORK, N. Y., A CORPORATION OF DELAWARE.

DOUBLE PIVOT SUPPORT FOR DUMP BODIES.

Application filed December 29, 1923. Serial No. 683,295.

This invention relates to dump bodies designed primarily for light automobile trucks. It has particular reference to the means of support for these bodies, and its object is to provide an improved dump body supporting means.

Dump bodies of this character are pivotally supported below their centers of gravity so that the dumping movement, once initiated, tends to proceed automatically and with acceleration. It is customary to provide shock springs and chains to connect the front end of the dump body with the frame of the vehicle to limit the angular movement of the body when it is dumped. It is evident that in dumping a heavy load the angular velocity and momentum of the body is often extremely great, resulting in a proportionately severe pull and shock upon the shock chains and springs when the rotation of the body is suddenly arrested by them. This shock is transferred, in spite of the presence of the shock springs, to the frame or chassis of the vehicle, in sufficient degree to partially lift the forward portion of the vehicle from the front vehicle springs and generally jar the whole vehicle, loosening joints and otherwise causing wear and injury.

The present invention resides in the provision of a double pivot supporting means of particular construction which facilitates the dumping operation, causing it to be accomplished quickly and with relatively small effort on the part of the operator, and which reduces the shock and resulting wear upon the frame of the vehicle upon which the dumping body is mounted.

The invention may best be understood by reference to the following description taken in connection with the accompanying drawings illustrating, by way of example, one embodiment of the invention. In these drawings Fig. 1 is a view in side elevation of the rear portion of an automobile truck upon which a dump body is carried by my improved supporting means;

Fig. 2 is an enlarged view in side elevation illustrating the construction of the supporting means; and Fig. 3 is a view similar to Fig. 2 showing the relation of the parts shortly after the dumping movement has been initiated.

Referring to the accompanying drawings, there is here shown an automobile truck chassis 10 upon which a dump body 11 is mounted. The dump body is normally carried in horizontal position upon the supporting means of my invention indicated generally by reference numeral 12, which is placed approximately under, but preferably also just in the rear of, the center of gravity of the body. Usually two of these supporting means 12 are employed, one of them being located near each side of the body. At its front end the body 11 is supported by means of a pair of feet 13, one on each side of the body, which rest upon the chassis 10 when the body is in its normal position ready for the transportation of a load.

The load is so distributed in the body that in the absence of any external force the body will remain horizontal, but this balance is a rather delicate one and a relatively slight external force or redistribution of the load serves to disturb it and start the dumping. Hence, the body is locked in horizontal position, during loading and transit. For this purpose, when the dump body 11 is in horizontal position, a spring pressed pin 14 is adapted to enter and be held within an aperture in the part 15 which depends from the front end of the dump body 11. The part 15 is usually located midway between the feet 13 and its lower end is bent rearwardly, as shown at 16, in order that its lower forward surface may engage the end of pin 14 as the dump body is returning from dumping position to the horizontal position, and force pin 14 forward so as to allow it to snap into the above mentioned aperture in the depending part 15. In order to release this locking device so as to dump the body 11, the handle 17 is provided which is attached to the front end of pin 14 and which as it is rotated to one side or the other moves over a cam surface 18 on the front end of a member 19, which draws the pin 14 longitudinally forward against the pressure of its spring and disengages it from the aperture in the depending part 15.

A handle 20 is provided at the front end of the dump body 11 by which, if desired, the dumping movement may be initiated and by which, also, the dump body may be returned to the horizontal position. The dump body is also provided with a rear gate 21 pivoted at 22 and held at the bottom by a spring pressed latch 23 which is automatically tripped by the chain 24 as the body is tilted to the dumping position. A pair of shock springs 25 are provided, one at each side of the forward end of the dump body, and are connected by suitable chains with the chassis of the vehicle to limit the angular movement of the body at the dumping position and to relieve whatever shock may result from the dumping of a heavy load.

The improved supporting means 12 for the dump body comprises the cooperating sections 26 and 27 (Figs. 2 and 3), the upper section 26 being suitably and firmly secured to the bottom of the body 11 and the lower section 27 being appropriately mounted upon the chassis 10, as for example by means of the bolts 28. The lower section 27 has two pivot bearings 29 and 30, preferably saddle-shaped, substantially as illustrated, the pivot bearing 30 being disposed somewhat below and a short distance in the rear of pivot bearing 29. The upper section 26 is provided with two pivots 31 and 32, the lower portions of which are each provided with knife edges that are adapted to coact with the saddle-shaped pivot bearings 29 and 30, respectively. Pivot 31, together with pivot bearing 29, and pivot 32, together with pivot bearing 30, thereby form two pivotal supports about each of which successively the dump body 11 may be rotated in the operation of dumping.

The walls of the pivot bearings 29 and 30 extend transversely from the web 33 and are stiffened by suitable gussets such as those shown at 34 and 35 respectively. The pivots 31 and 32 are, as shown, substantialy triangular shafts extending transversely of the web 36 of the upper section 26, the lengths of these pivots and their pivot bearings 29 and 30 being proportioned according to the weight to be supported.

The pivot bearing 29 is saddle, or trough, shaped throughout its length and is open at the top so that the pivot 31 may be easily laid therein. The pivot bearing 30, however, is provided at one end, which is the near end as viewed in the drawings, with a strap 37 which extends upwardly over the top of pivot 32. The side walls 38 and 39 of this strap are adapted to coact with the sides of the upper part of pivot 32 to prevent pivot 31 from climbing up on either of the walls of pivot bearing 29, and for this reason they are formed respectively on radii struck from the middle of pivot bearing 29 as a center. The top wall 40 of the strap 37 which joins walls 38 and 39 is preferably shaped to conform to the upper face of pivot 32 and cooperates with this face to prevent vertical movement of the dump body 11 and to also assist in holding pivot 31 upon pivot bearing 29. The parts are so proportioned, however, that when the dump body is in normal horizontal position there is a slight clearance between the top of pivot 32 and the top wall 40 of strap 37 so as to guard against any of the weight of the body being taken by the strap.

The strap 37 is of sufficient width to give the required strength, but, as before stated, it is positioned at the near end of pivot bearing 30 and consequently engages pivot 32 only in the vicinity of one end thereof. In assembling sections 26 and 27 of the support, it is therefore only necessary to lay one end of pivot 31 within its bearing 29 and slide section 26 bodily to bring pivot 32 underneath the strap 37. When, however, a dump body is mounted upon a vehicle chassis with two of these supports which have their straps 37 disposed in opposite directions, the body will be held securely in place.

With the body in the normal horizontal position the entire weight of the body and the load will be carried upon pivot 31 and bearing 29 and this weight will ordinarily be sufficient to prevent these bearings from becoming separated. Nevertheless, during transit the dump body is necessarily subjected to relatively severe twisting and turning movements, as well as forces which tend to shift the body horizontally and vertically. The presence of strap 37 effectively retains pivot 31 within its bearing 29 and in this manner resists both twisting and shifting movements, any tendency to side shifting being taken directly by the strap 37, the sides of which contact with the side of upper section 26.

In the operation of a dump body which is provided with the improved supporting means of the invention, let us assume that the body 11 is fairly uniformly loaded and is in the normal horizontal position of transit or charge-carrying position as shown in Fig. 1. In order to dump this load the handle 17 is pulled to one side to disengage the locking pin 14 from the part 15. The center of gravity of the load is, we will assume, just forward of pivot 31, say, for example, in the position A. By a lift upon handle 20 or by otherwise disturbing the equilibrium of this balance, the body 11 is now tipped a little to bring the center of gravity just past the vertical line through pivot 31, say, for example, to the point B. The weight of the load now causes an accelerated rotation of the body 11 about pivot 31 and pivot 32 descends toward its pivot bearing 30.

In Fig. 3 these parts have come into engagement with one another and the center of support of the load is now shifted from pivot 31 to pivot 32. The center of gravity, however, has not shifted as rapidly as the center of support in the rearward direction and is approximately at the point C which is forward of pivot 32. If it were not for the momentum of the load, a point of equilibrium would be reached with the pivots in contact with their pivot bearings as shown in Fig. 3. However, because of this momentum the body 11 will continue to rotate, but this time about the pivot 32, the center of gravity of the load being shifted over the vertical center line of pivot 32, but in so doing the angular velocity of the dump body will be considerably reduced and, the rear gate 21 having been automatically tripped, the load will commence to be discharged. Then the rotation of the dump body 11 to the full dumping position will proceed with greatly reduced acceleration so that the shock of stopping the body is easily absorbed by the shock springs 25 without objectionable jarring or vibration of the chassis 10 of the vehicle.

The location of the pivots and bearings is preferably such that the body will be tipped to an angle of about 20° when pivot 32 touches its bearing 30.

After the dump body begins to rotate about pivot 32 the pivot 31 leaves its pivot bearing 29 and describes an arc about the bearing 30. Also the rear face 41 of pivot 32 approaches the face 42 of pivot bearing 30 and the upper surface 43 of pivot 32 passes underneath an overhanging portion 44 by which wall 39 of strap 37 is joined to the rear side of pivot bearing 30. By the engagement of the upper surface 43 with the overhanging wall 44 the pivot 32 is prevented from escaping from pivot bearing 30, the faces 42 and 44 forming a kind of socket which holds the pivot in place. Hence, in this manner the body 11 is locked to the frame of the vehicle so that the vehicle may be advanced if desired to assist in the discharge of the load without danger of losing the body.

In order to restore the dump body to its normal position the operator may grasp the handle 20 and without undue effort pull that end of the body toward him until its center of gravity has been brought back in front of the vertical line through pivot 32. This may be done with much less effort than if only a single pivot such as pivot 31 were employed, because of both the rearward and somewhat lower elevation of pivot 32. Body 11 will now tend to fall toward the horizontal position but its progress will again be retarded by the retransfer of its weight from pivot 32 back onto pivot 31. This returning operation hence is also accomplished with less wear and tear upon the frame of the vehicle.

The employment of the improved supporting means in the mounting of dump bodies thus renders them easy to operate, as they may be dumped and returned to loading position with relatively small effort. The dumping can be accomplished in a relatively short time because of this small effort required to start the dumping. Yet the dumping movement, once initiated, proceeds only with hesitation, and is completed without the usual shock and accompanying wear and tear to the vehicle.

I claim:

1. A support for a vehicle dump body comprising cooperating sections, two saddle-shaped pivot bearings on one of said sections and wedge-shaped pivots on the other of said sections adapted to co-act with said bearings, one of said pivot bearings being disposed at a lower elevation than the other and the body being adapted to rotate about each of said bearings successively in passing to and from the dumping position, said lower bearing being provided with a member extending upwardly over the top of the pivot co-acting with said bearing to retain the higher pivot in engagement with its pivot bearing while the dump body is in normal position during transit, said member forming an arcuate slot with the higher pivot bearing as a center, the front and rear walls of said slot co-acting with the front and rear edges of the wedge-shaped pivot therewithin during the rotation of the body about the higher pivot and said slot being widened at the bottom to allow the rotation of said wedge-shaped lower pivot to take place.

2. A support for a vehicle dump body comprising cooperating sections, two saddle-shaped pivot bearings on one of said sections, and wedge-shaped pivots on the other of said sections adapted to co-act with said bearings, one of said bearings being disposed at a lower elevation than the other and the body being adapted to rotate about each of said bearings successively in passing to and from the dumping position, the lower pivot bearing being provided with a member extending upwardly over the top of the pivot co-acting with said bearing to retain the higher pivot in engagement with its bearing while the dump body is in normal position during transit, said member forming an arcuate slot having the higher pivot bearing as a center, the front and rear walls of said slot co-acting with the front and rear edges of the wedge-shaped pivot therewithin during the rotation of the body about the higher pivot, and said rear wall having an overhanging portion adjacent the top of the lower pivot when it rests in its bearing to allow the rotation of said wedge-shaped lower pivot to take place, said portion co-acting with the top of said pivot to hold said pivot in place during this rotation.

3. A vehicle dump-body construction of the class described, comprising a main pivotal support including a saddle-shaped pivot bearing associated with the vehicle frame, and a wedge-shaped pivot having a knife-edge and associated with the vehicle body and coacting with said pivot bearing to support said vehicle body in a substantially scale-balanced position at the center of gravity of said body, a second knife-edge pivot positioned to the rear of the first pivot and having its lower edge in approximately the same plane as the lower edge of said first pivot, a second saddle-shaped bearing positioned to the rear of and below said first bearing so that the dump-body rotates on each of said bearings successively during its dumping movement, a guiding and locking member associated with said rearward pivot bearing comprising a member extending upwardly over the top of said rearward pivot and in close proximity thereto when said dump-body is in its horizontal position to thereby lock said main pivot, whereby said body is restrained from movement in every direction except in the direction of normal dumping movement, and releasable locking means on the vehicle frame at the front end of the body for preventing the dumping movement of the body during transit.

4. A vehicle dump-body construction of the class described, comprising a main pivotal support including a saddle-shaped pivot bearing associated with the vehicle frame, and a wedge-shaped pivot having a knife-edge and associated with the vehicle body and coacting with said pivot bearing to support said vehicle body in a substantially scale-balanced position at the center of gravity of said body, a second knife-edge pivot positioned to the rear of said first pivot and having its lower edge in approximately the same horizontal plane as the lower edge of said first pivot, a second saddle-shaped bearing positioned to the rear of and below said first bearing and having its front wall and the upper portion of its rear wall concentric with the center of rest of said first pivot, a guiding and locking member associated with said rearward pivot bearing comprising a member extending over the top of said rearward pivot and in close proximity thereto when said dump-body is in its horizontal position to thereby lock said main pivot, whereby said body is restrained from movement in every direction except in the direction of normal dumping movement, and releasable locking means on the vehicle frame at the front end of the body for preventing the dumping movement of the body during transit.

5. A vehicle dump-body construction of the class described, comprising a main pivotal support including a saddle-shaped pivot bearing associated with the vehicle frame, and a wedge-shaped pivot having a knife-edge and associated with the vehicle body and coacting with said pivot bearing to support said vehicle body in a substantially scale-balanced position at the center of gravity of said body, a second knife-edge pivot positioned to the rear of the first pivot and having its lower edge in approximately the same horizontal plane as the lower edge of said first pivot, a second saddle-shaped bearing positioned to the rear of and below said first bearing and having its front wall and the upper portion of its rear wall concentric with the center of rest of said first pivot, a guiding and locking member associated with said rearward pivot bearing comprising a member extending over the top of said rearward pivot and in close proximity thereto when said dump-body is in its horizontal position to thereby lock said main pivot, whereby said body is restrained from movement in every direction except in the direction of normal dumping movement, and another guiding and locking member acting when said rearward pivot is seated in said socket, comprising an offset in the lower portion of the rear wall of said socket, and another portion of said wall extending upwardly over said pivot, to thereby permit continued tilting of said body while the vehicle is moving forward, and releasable locking means on the vehicle frame at the front end of the body for preventing the dumping movement of the body during transit.

In testimony whereof I affix my signature.

EDWARD A. DEWALD.